Feb. 26, 1963 E. C. THOMSON 3,078,936
SCALE
Filed April 27, 1959 4 Sheets-Sheet 1

Inventor
Elihu C. Thomson
by Maxwell Fish
Atty.

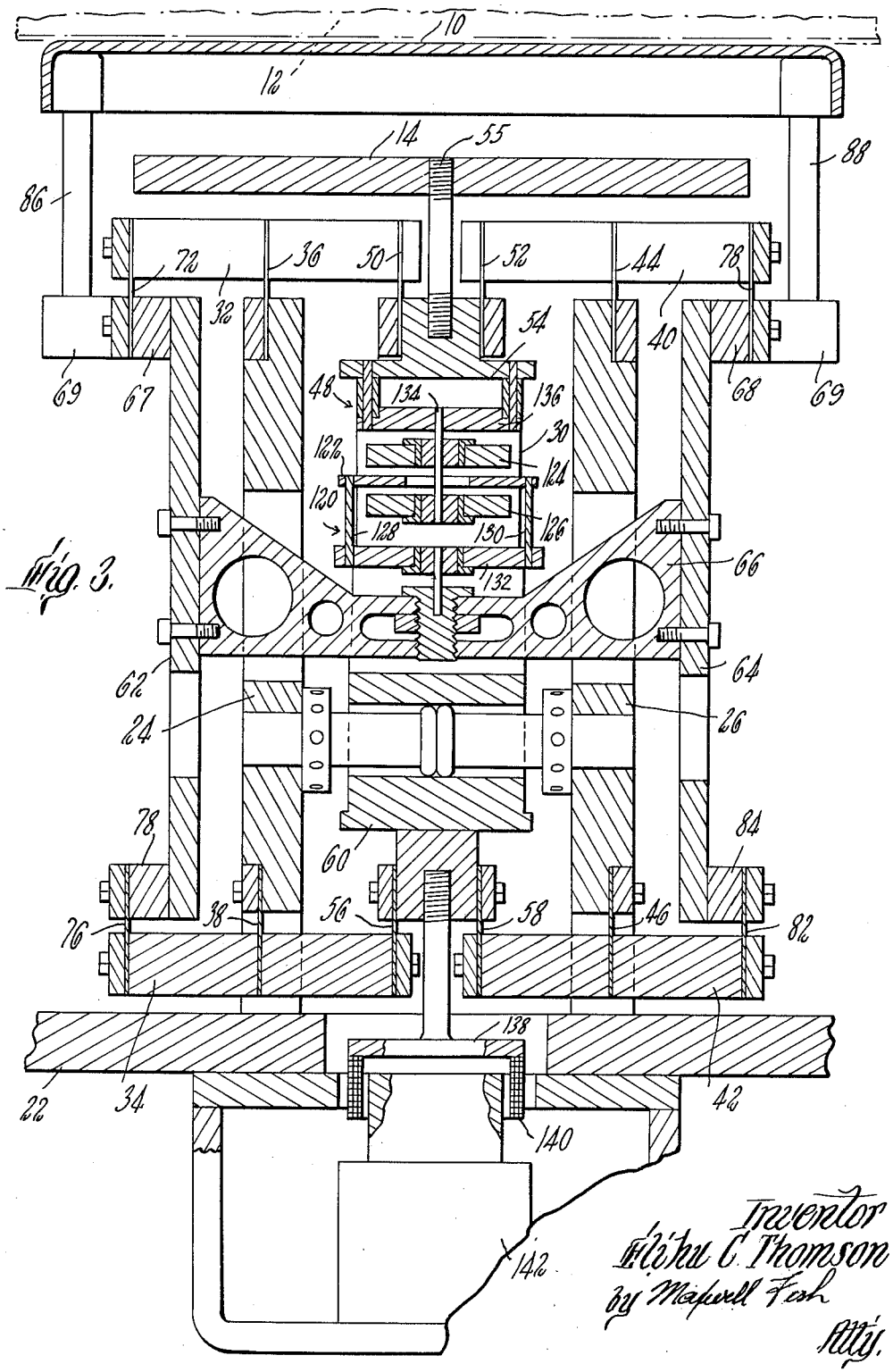

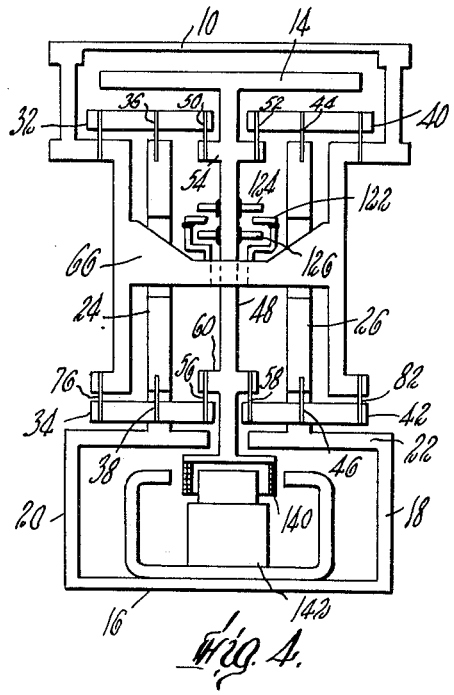

United States Patent Office 3,078,936
Patented Feb. 26, 1963

3,078,936
SCALE
Elihu C. Thomson, Wellesley, Mass., assignor to Farrington Machines, Inc., Cambridge, Mass., a corporation of Massachusetts
Filed Apr. 27, 1959, Ser. No. 809,115
11 Claims. (Cl. 177—210)

The present invention relates to a scale, and more particularly to a high speed scale which is well adapted for weighing successive items in very rapid succession and with a high degree of accuracy.

The invention is concerned more particularly, although by no means exclusively, with a weighing operation of the general type in which each of successive increments of material to be weighed differs in weight by a relatively small amount from a specified unit value, and the scale is employed to determine precisely the weight of the small increment of said material which represents the correction required to make up a package of the specified unit weight.

In accordance with the invention a scale is provided which comprises a mechanically constructed and operating balance system including a balance supporting a weight to be measured and a counterweight, and devices capable of securing instantaneous weight measurements in very rapid succession upon increments of said material placed successively on the scale. In the preferred form of the scale shown, electrical devices are provided which include means to detect the fact that an unbalance has occurred, electrical means for producing a measurable balancing force to restore the balance, and means for measuring the force and thereby the weight to be measured.

It is a principal object of the invention to provide in a scale of the general type described which is adapted for measuring in very rapid succession deviations from a norm of each of successive increments of material placed on the scale and in which the scale balance is achieved by a combination of mechanically offsetting and force applying components, a novel and improved device for eliminating random errors in successive readings produced by vibrations transmitted to the scale from its supporting base.

It is more specifically an object of the invention to provide a novel and improved scale, having offsetting weight and counterweight masses which is mechanically constructed and arranged to be insensitive to and quite unaffected by vibrations transmitted to the scale from its supporting base when the scale including these offsetting weight masses have been brought into the state of balance.

The scale employed is of the general type having a balancing system, a counterweight, a weight to be measured, and means for applying a corrective force to the balancing system to redress whatever unbalance tendency is produced by the placing of successive weights to be measured on the scale, so that beam deflection is maintained nearly at zero and the distribution of the weight and counterweight masses with relation to the balance system may be assumed to be constant.

A feature of the invention consists in the development and application of a form of balance system, and a distribution of the several weight factors in the system, which will effectively neutralize any unbalancing offset produced by vibratory movements of the weight and counterweight with the scale in any direction including specifically rotary vibrational movements. To this end the balance system of the scale is so constructed and arranged, and the mass of the counterweight is so disposed with relation to the mass of the weight to be measured that the centers of gravity of these two masses will always be so related to one another that the scale will be unaffected by translatory and more particularly by rotational vibratory movements of the entire scale in any direction.

More specifically, a feature of the invention consists in the provision of a double balance system, each of said balances comprising one or preferably two pivoted balance bars so arranged that one end of each balance is connected to move one of said weight and counterweight in a substantially vertical direction, the other end of each balance being similarly connected to the other of said weight and counterweight to move same in a substantially vertical direction and in which the centers of gravity of said weight and counterweight masses be in the same vertical plane parallel to the pivot axes of the balance beams.

A further feature of the invention consists in the construction and arrangement of the balance system of the scale arranged to cause the centers of gravity of the two masses to lie in the same vertical plane which is parallel to the pivot axes in which said centers of gravity will also coincide as nearly as possible horizontally along a line in said plane parallel to the pivot axes when the scale is in balance.

It is an object of the invention to provide in a scale which is especially, but not exclusively, adapted for high speed measurements, a novel balance system including offsetting weight and counterweight masses which is so constructed and in which said masses are so disposed for a predetermined balance position of said balance system to render the scale insensitive to translatory and rotational vibrations transmitted to it in any direction, in combination with a scale balance control and measuring device including means for applying a force adjusted to redress any unbalance of said masses to maintain the balancing system substantially in said balanced position, and thereby to substantially eliminate random errors in the measurement of the weight of each successive increment of material placed on the scale which might otherwise result from the transmission of such vibrations to the scale from outside sources.

With the above and other objects in view as may hereinafter appear, the several features of the invention consist also in the devices, combinations and arrangement of parts hereinafter described and claimed, which together with the advantages to be obtained thereby will be readily understood by one skilled in the art from the following description taken with the accompanying drawings in which:

FIG. 3 is a sectional view in front elevation taken on a line 3—3 of FIG. 2;

FIG. 4 is a diagrammatic view of the double balance system of the scale illustrated in FIGS. 1 to 3 inclusive;

Figure 9:
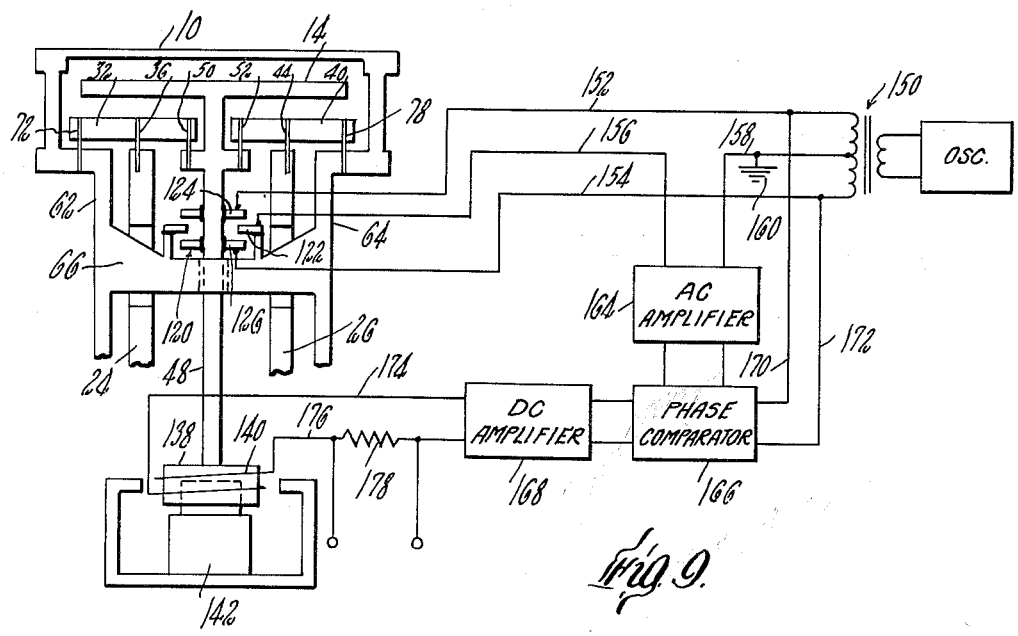
Figure 10:
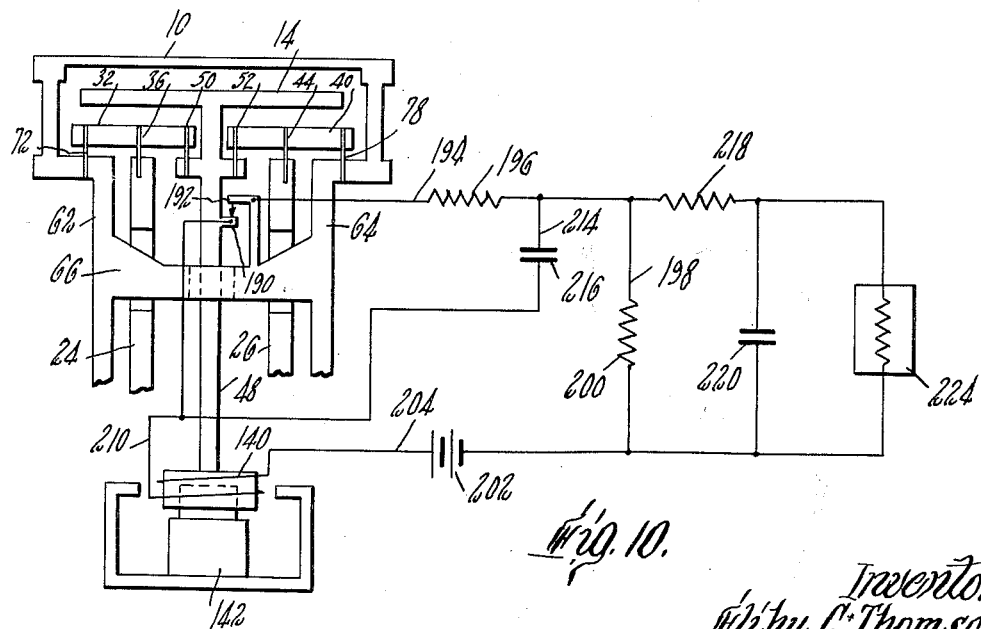

FIGS. 5 to 8 inclusive are a series of diagrammatic views illustrating a plurality of arrangements of scale balance systems in accordance with the invention including and indication of the intended location of the centers of gravity of the weight and counterweight assemblies for a balanced position of the scale of which;

FIG. 5 is a diagrammatic view of the balance system including the centers of gravity of the weight and counterweight corresponding with the disclosure of FIGS. 1 to 4 inclusive;

FIG. 6 is a diagrammatic representation of a scale balance system in which one of the double beams in each of the two scale balances has been omitted;

FIG. 7 is a diagrammatic representation of a scale balance system similar to that of FIG. 6 in which one double link has been added; and FIG. 8 is a diagrammatic representation of a double balance system in which one balance beam has been mounted directly above the other on the same vertical supporting pivot post;

FIG. 9 is an electrical diagram illustrating one form of electrical control and weight measuring system for the scale of FIGS. 1 to 5; and FIG. 10 is an electrical diagram illustrating an alternative form of electrical control and weight measuring system for the scale of FIGS. 1 to 5.

The scale illustrated in the drawings as embodying in a preferred form the several features of the invention compirses a double balance two bar scale having a pan supporting plate 10 on which is carried a weight receiving pan indicated at 12 and a counterweight 14 which is located directly beneath the pan supporting plate 10 so that the center of gravity of the counterweight 14 and associated parts substantially coincides with the center of gravity of the weight to be measured and associated parts including the pan 12, the material loaded on the pan, the pan supporting plate 10 and the supporting structure on which the plate 10 is carried.

The scale assembly comprises a box frame having a base plate 16, two vertically disposed side plates 18, and 20 and an intermediate floor plate 22.

The balance mechanism is mounted from the floor plate 22 on an inner frame comprising two uprights 24, 26 which are secured to the floor plate 22.

The balancing mechanism of the scale as best shown in FIGS. 3 and 4 comprises two double beam balances, one balance comprising two parallel beams 32, 34 which are mounted from the upright 24 on frictionless spring pivots 36, 38, and the other balance comprising two parallel beams 40, 42 mounted on frictionless spring pivots 44, 46 on the upright 26. The two double beam balances above described are located at opposite sides of an imaginery vertical line which represents the vertical axis of the coinciding centers of gravity of the weight and counterweight.

Figure 1:
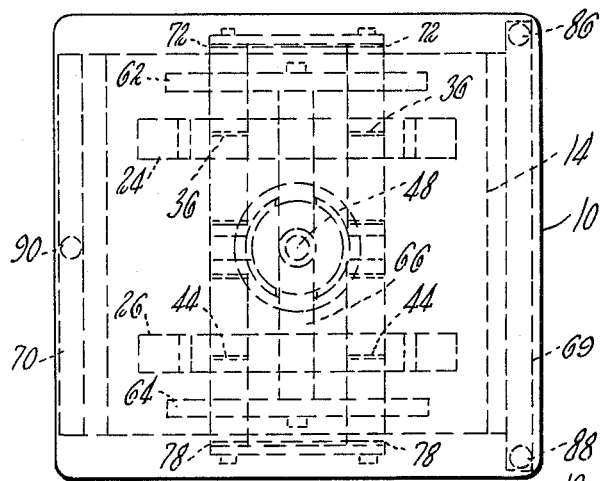
FIG. 1 is a plan view of a scale embodying in a preferred form the several features of the invention.
Figure 1A:
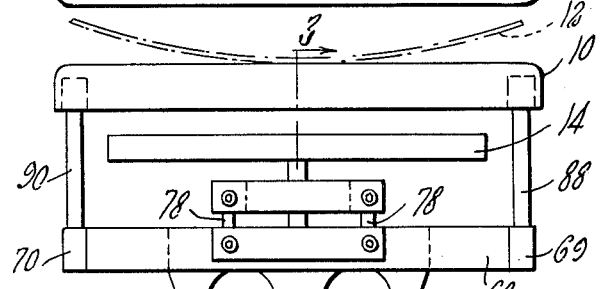
FIG. 1a is a perspective view of the cylindrical counterweight post showing the slots formed thereon.

The beams at their inner or adjacent ends are all connected with a centrally located cylindrical counterweight post assembly which takes the form of two-semicylindrical shells 48 separated to provide two vertical slots, one at each side of the cylinder indicated in FIG. 1a and in the diagrammatic FIG. 4. The upper beams 32 and 40 of the respective balances are connected by frictionless spring pivots 50, 52 with a cyilndrical cap 54 (see FIGS. 1a and 3) which forms part of the cylindrical counterweight post assembly 48. The counterweight 14 is supported above the cap 54 on a rod 55 threaded at one end into the cap 54 and at its upper end into the counterweight 14. The lower beams 34 and 42 of the two balances are connected respectively by means of frictionless spring pivots 56 and 58 with a collar 60 forming part of the cylindrical counterweight post assembly 48.

The beams 32, 34, 40 and 42 forming the two double beam balances are connected at their outer ends respectively to two vertically disposed side plates 62, 64 which form part of a rigidly constructed vertically movable frame forming part of the weight assembly of the scale. The frame referred to comprises with the side plates 62, 64 a cross beam 66 which is set vertically on edge and is connected at the two ends to the respective side plates. At their upper ends the side plates 62, 64 have secured thereto horizontally disposed straps 67, 68, which are connected transversely by straps 69, 70 to form a closed square. The outer ends of the respective balance beams are connected respectively by means of frictionless spring pivots with brackets secured to the frame side plates 62, 64. Beam 32 is connected by a spring pivot 72 with the strap 67 connected to the side plate 62. Beam 34 is connected with the lower end of side plate 62 by means of a spring pivot 76 which is fastened to a bracket 78 on the lower end of the side piece 62. Similarly, beam 40 is connected by means of a spring pivot 78 with the strap 68 secured to the upper size of the side plate 64, and beam 42 is connected by a spring pivot 82 with a bracket 84 secured to the lower end of the side plate 64. The weight assembly of which the weight supporting frame above described forms a part also includes three telescoping vertically adjustable support posts 86, 88 and 90 of which posts 86 and 88 are mounted on strap 69 and post 90 is mounted on strap 70 providing a three-point support for a pan supporting platform 10.

The distribution of the weight and counterweight masses in the scale by virtue of which the scale is rendered insensitive to vibratory movements in any direction will be most readily understood from an inspection of the FIGS. 5, 6, 7 and 8 which illustrate in diagrammatic form a number of different arrangements of balance systems, and the location of the centers of gravity of the weight and counterweight in each system.

FIG. 5 illustrates in diagrammatic form substantially the balance system and mass distribution employed in the scale shown in FIGS. 1 to 4 inclusive. Inasmuch as FIG. 5 is a diagrammatic representation of the two beam double balance system illustrated in FIGS. 1 to 4 inclusive, the same reference characters have been employed in FIG. 5 so far as possible to designate parts corresponding with those shown in FIGS. 1 to 4 inclusive.

For the purpose of discussion of FIGS. 5 to 8 inclusive, it is assumed that the weight and counterweight in each case comprise offsetting masses which are in balance, and that frictionless spring pivots capable of lateral adjustment similar to those shown in FIGS. 1 to 4 are employed. The double beam balance system shown, for example, in FIG. 5 eliminates any tendency of the weight and counterweight masses to move relatively to one another when subjected to a vertical translatory movement. Regardless of where the increment of material to be weighed is placed in the pan, the vertical force is still effectively applied at the point of attachment to the beams.

In the diagram of FIG. 5 the masses of the weight and counterweight are shown as movable along the same vertical line which passes through the centers of gravity of both masses, and through the pivots of the adjacent ends of the two beam balances. The state of balance, which is indicated by the spatial relationship between the weight and the fixed frame, will not then be distributed by any translation motion of the scale, because forces produced by translational acceleration of the weight which tend to displace it relative to the frame are counterbalanced by equal and opposite forces produced by acceleration of the counterweight. Thus the weight system is compelled to move in the same translatory motion as the frame.

The arrangement of the scale, in which the masses of weight and counterweight are shown as movable along the same vertical line which passes through the centers of gravity of both masses, has the very important effect of causing the scale to be rendered insensitive or immune to displacements due to rotational vibrations transmitted through the frame of the scale. The manner in which the masses of weight and counterweight are offset from one another when subjected to such rotational vibrations may be described as follows: When the weight and counterweight are in a vertical plane parallel to the pivot axes, then the forces which are applied to them when the frame rotates as a result of rotational vibration do not have any components in such a direction as to cause any displacement of the weights relative to the frame, except for possible centrifugal forces which are in any event very small and which are entirely eliminated where the centers of gravity of the weight and counterweight are caused to coincide horizontally as well as vertically for the balance position of the scale.

In addition to the two conditions already described required to render the scale insensitive to transmitted vibrations, namely the use of a double balance system and the location of the centers of gravity of the weight and counterweight assemblies when in a condition of balance in a predetermined position in the same vertical plane, FIG. 5 fulfills a further condition that the line joining the centers of mass of the weight and counterweight should be parallel to the axes which are parallel to each other. If so, both the centers of mass are the same distance from any arbitrary axis of rotation parallel to the pivot axes and will have equal and opposite centrifugal forces due to rotation about these axes. Assuming, however, that the centrifugal forces due to rotational vibration are small and can be ignored, this further condition is not required.

FIG. 5 illustrates diagrammatically an ideal condition in which the two centers of mass coincide exactly with one another when the scale is in balance. Under these conditions it will be readily appreciated that no translatory or rotational vibratory movement of the scale frame can have any affect on the balance position of these masses relative to one another.

FIG. 6 illustrates diagrammatically a somewhat simplified form of the balance system in which the second beam of each double beam balance has been eliminated in the interest of producing a simpler and lighter construction. The performance of the scale is unimpaired for the weight and counterweight are stably positioned in the horizontal plane by two pivot points, and the requirements for rotational stability above noted are still met including the requirement that the centers of gravity of both weight and counterweight are disposed for movement along the same vertical line. In this modification of FIG. 6 the position of the center of mass of the counterweight is more critical, however, for stability since it must lie along the line 96, 98 which is not parallel to the vertical line 100, 102. To satisfy the condition noted above that the centers of gravity of the weight and counterweight assemblies must move from a predetermined balance portion along the same vertical line there is only one position along the line 96, 98 for the counterweight.

FIG. 7 discloses a balance system which is very similar to that of FIG. 5, the balance arm 42, however, having been entirely omitted, and a short link 110 substituted for balance arm 34 of the left-hand double-beam balance of FIG. 5. FIG. 7 thus discloses a double balance system in which two single beam balances are employed but with the addition of the link 110 to guide the counterweight for movement in an up and down direction.

FIG. 8 discloses a substantial variation from the balance systems previously considered. In this embodiment a single supporting post 112 centrally located in provided, and the two beam balances are mounted one above the other on the post 112. The upper beam balance comprises a beam 114 which is pivoted intermediate its length on the post 112, and the lower beam balance comprises a short beam 116 pivoted from the post 112 at a lower level. In this embodiment of the invention the weight and counterweight are mounted directly above one another but at one side of the balance system. The counterweight is carried on a link 118 which is pivotally connected with the balance beam 116 and extends diagonally upwardly to the left, being connected at its upper end to the left hand end of the balance beam 114. The weight is similarly mounted on a diagonally disposed link 120, which is pivotally connected to the right hand end of the balance beam 114 and extends diagonally downwardly to the left, being connected at its lower end with a link 122 on the post 112. A downward movement of the weight mounted on the right hand end of balance beam 114 and link 122 causes the left hand end of the said balance beam to rise, acting through link 118 to rock the balance beam 116 and link 118 upwardly and thus to correspondingly raise the counterweight. Alternatively, an upward movement of the weight will effect a corresponding downward movement of the counterweight. The construction illustrated in FIG. 8 in fully compensated against translatory vibrations transmitted to the scale. The balance system is also to a substantial extent insensitive to rotational vibrations imparted to the scale. The efficiency of the scale is, however, greatest when the center of gravity of the weight and counterweight can be made to coincide in the same horizontal plane.

In the illustrated form of the invention, electrical devices are provided for controlling the operation of the scale and for measuring deviations from a predetermined unit weight of each of a series of increments of material placed successively upon the weighing pan of the scale. The control system employed involves the application of a counter-force which is at all times equal and opposite to the force exerted by the weight on the scale, thereby preventing the beam balance system for deflecting from a predetermined balance position more than a negligible amount which is sufficient only to give rise to the appropriate opposing force. The weight is measured with reference to the known counterweight force which when added to the weight in the scale pan is sufficient to avoid a greater than negligible deflection. This force is preferably generated by the reaction of the magnetic field generated by a current carrying coil to a permanent magnetic field. Assuming that the permanent field is constant, the force on the coil is proportional to the current in the coil. Therefore, the current required to maintain zero deflection is a measure of the weight and is so used in lieu of the beam displacement.

The control system herein described is particularly adapted for the making of instantaneous weight measurements in rapid succession under conditions in which the weight and counterweight masses are maintained at all times substantially in a predetermined scale balance position. This construction and mode of operation of the control system functions in combination with the improved scale double balance system above described to provide such measurements in rapid succession, while at the same time all possible random errors due to vibrations imparted to the scale are substantially eliminated.

Essential elements of the control systems for the scale comprise a displacement detector device and a current-to-force transducer, which may take the form of a current carrying coil movable in a magnetic field, and which is responsive to the detector which acts so as to hold the displacement to a negligible amount. In the form of the control system shown in FIGS. 1, 2 and 9, a current amplifier is interposed between the displacement detector device and the current-to-force transducer. The system functions as follows: If the weight of the increment of material placed in the pan differs from the mass of the counterweight, the balance will be displaced until the said displacement produces a counter-force sufficient to balance said weight and to prevent further displacement. A counter-force thus generated will be exactly equal to the corrective weight required and can be measured by measuring the current used to generate said counter-force.

Figure 2:
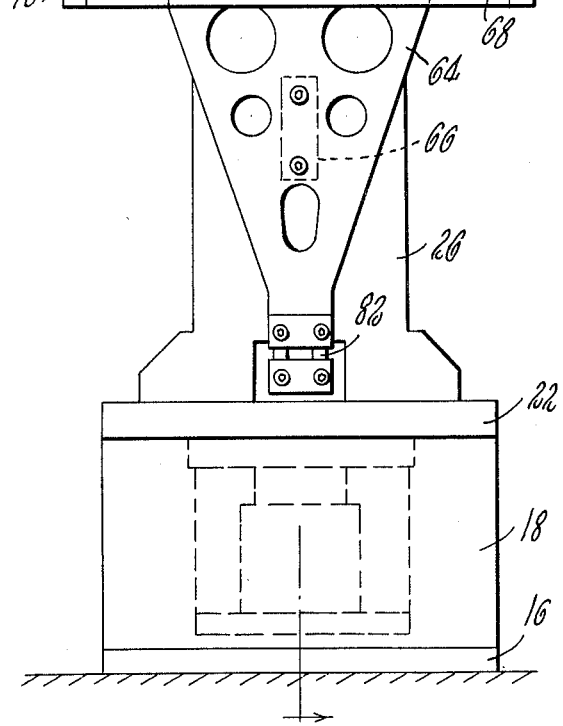
FIG. 2 is a view in right side elevation of the scale shown in FIG. 1.

One form of the electrical control and measuring system employed as shown in FIGS. 1, 2 and 9 of the drawings includes a balance displacement detector device comprising a differential capacitor 120 having a central plate 122 connected to move with the weight assembly including tie member 66, and two plates 124 and 126 disposed at opposite sides of the plate 122 in spaced relation thereto and connected to move with the counterweight assembly on post 48. As best shown in FIGS. 1, 2 and 3, the central plate 122 is mounted on two upright members 128, 130 on a transverse plate 132 which is in turn secured to the tie member 66. The two spaced apart plates 124 and 126 are mounted on a central spindle 134 which passes through a central aperture in the plate 122 and is secured at its upper end to a transverse plate 136 mounted in the upper end of the cylindrical post 48 forming part of the counterweight assembly.

A current-to-force transducer is provided which comprises a coil movable in a magnetic field provided by a stationary magnet. A cylinder 138 secured to the lower end of the cylindrical post 48 of the counterweight assembly has wound thereon coils 140. The cylinder and coils 140 are arranged in the field of a permanent magnet 142 secured to the frame of the scale.

Referring more specifically to the electrical diagram of FIG. 9, a transformer 150 supplies the two capacitor plates 124, 126 with equal voltages with respect to ground, but opposite in phase, through connecting wires 152, 154 respectively. The relatively movable plate 122 is connected through wires 156, 158 and a ground 160 with the midpoint of the transformer 150. Assuming that the movable plate 122 is midway between the two plates 124, 126, it will be at ground potential, and there will be no voltage between it and the ground. This corresponds to a state of balance. If the unknown weight exceeds the counterweight, for example, the latter will rise and electrically unbalance the differential capacitor. Since the capacitance from the central plate to the lower plate is increased and that to the upper plate 126 is decreased, a voltage is developed to ground. This voltage is amplified and compared with a reference phase derived from the original source of voltage through connections which include an A.C. amplifier 164 to which wires 156 and 158 are connected, a phase comparator 166, and a D.C. amplifier 168. The phase comparator 166 is also connected by wires 170, 172 with the two sides of the transformer to provide a reference phase. The D.C. amplifier 168 is, in turn, connected by means of a wire 174 with one end of coil 140 and by a wire 176 and a current measuring meter 178 with the other side of coil 140. The voltage created by the unbalance of the differential capacitor is amplified in the A.C. amplifier 164, and is compared with the reference phase in the phase comparator 166 to produce a signal which is rectified and amplified by the D.C. amplifier to a high enough current to drive the restoring coil. A voltage proportional to weight is derived from the resistance 178 in series with the wire 176. It will be understood that the differential capacitor may be replaced by a differential transformer, or by other displacement-to-voltage or current transducers which may be found available.

The phase of the unbalance signal is compared with the reference phase to determine whether the displacement is up or down relative to the balanced, or zero-signal position. The amplifier will thus respond only to signals of the proper phase, indicating a displacement in the direction which can be corrected by current flow in the coil. The amplifier may also be designed to provide both positive and negative currents in response to both positive and negative displacements as indicated by the polarity of the output of the phase comparator, since the polarity of the output will be determined by the relationship of the unbalance signal phase to the reference signal phase.

An alternative form of electrical scale control is shown in FIG. 10. In accordance with the system here shown, at the instant the smallest measurable displacement due to weight placed on the scale is detected, the current in the coil is caused to rise discontinuously to a value more than sufficient to restore the displacement to zero with the heaviest anticipated weight. When the displacement is no longer detected, the coil current is caused to fall to zero and the beam again starts to displace.

The current occurs in pulses following each successive vibration of the beam, but the average force generated by the intermittent current pulses is just enough to offset the weight added to the scale. Since the beam displacement is small, the successive vibrations of the beam, and consequently the pulses induced thereby occur at a high repetition rate. The weight may be measured by causing this current to generate a voltage drop in a resistance, and a steady indication is obtained by electrical filtering. Because of the high pulse rate, a smooth average value is obtained quickly, and the weight measurement can be practically instantaneous.

In place of the differential capacitor shown in FIG. 9, there is provided in FIG. 10 an open and shut contact switch 190, 192 of which one element 190 is mounted to move with the counterweight assembly post 48. The other element 192 of the contact switch is mounted from the tie cross member 66 of the weight assembly.

The open and shut contact switch 190, 192 forms part of a circuit comprised by a wire 194 connected between contact arm 192 and a resistance 196, which is connected by a wire 198 and resistance 200 with a D.C. voltage source 202. A wire 204 connects the D.C. voltage 202 with the current carrying coil 140 of the current-to-force transducer, which is in turn connected by a wire 210 with the contact 190 of the open and shut contact switch 190, 192. A shunt circuit is provided across the open and shut switch 190, 192 by means of a wire 214 and the capacitor 216 which cooperates with the resistance 196 to slightly delay the signal to make more positive the making and breaking of the contacts of the open and shut switch 190, 192. Other elements of the circuit shown in the electrical diagram FIG. 10 include a resistance 218 and a capacitor 220 in parallel with resistance 200, and a high resistance voltage meter 224.

The operation of the electrical control system illustrated in FIG. 10 will be briefly described as follows: If the weight in the scale pan exceeds an amount determined by the counterweight, the counterweight assembly including post 48 and contact member 190 will rise, and close the open and shut contact switch 190, 192. This will cause a fixed current to flow through the closed circuit comprising wire 194, resistor 196, wire 198, resistance 200, wire 204, current source 202, coil 140 and wire 210. This current flowing in the coil 140 will produce a magnetic field which will react with the permanent field of the current-to-force transducer magnet 142, and create a force which will override the weight and cause the scale pan to rise, thereby causing the counterweight to fall and open contacts 190, 192. This will open the circuit collapsing said force, and allow the counterweight to rise until the contacts reclose. Capacitor 216 and resistor 196 by slightly delaying the effect of the making and breaking of contacts 190, 192 will cause this action to be more positive, and will stabilize the operation. A voltage proportional to the coil current will be produced across resistance 200 and the instantaneous fluctuations will be averaged out by resistor 218 and capacitor 220 so that the voltage across load resistor 224 will vary only with the weight and will be an accurate measure of the weight.

The invention having been described, what is claimed is:

1. In a weighing apparatus for ascertaining in rapid succession deviations in weight of each of a series of increments of materials presented successively to said weighing apparatus with relation to a selected weight, the combination of a frame, a mechanically acting double balance system including a pair of beam balances having horizontally disposed beams and pivot axes for said beams about which said beams turn in parallel relation on said frame, means pivotally connecting a beam end of one beam balance with a beam end of the other beam balance so that said connected beam ends move up and down as a unit, a support assembly having mass which includes a support on which an increment of material is supported for weighing, said increment of material, and those portions of said beam balance system at the same side of said pivot axes with said support, a counterweight assembly having mass which includes said counterweight and those portions of said beam balance system at the same side of said pivot axes with said counterweight, means for supporting one of said supper and counterweight from the connected beam ends of said balance system for up and down movement therewith along a substantially vertical path, means for supporting the other of said support and counterweight from an oppositely moving beam portion of said balance system for up and down movements therewith along a substantially vertical path, said support and counterweight assemblies having the centers of gravity of said masses located for movement from a balance position in the same vertical plane parallel to said axes whereby said masses in said balance position are substantially insensitive to both translatory and rotational vibratory movements transmitted through the frame to said scale, and means sensitive to any unbalance of said scale caused by deviation from said unit weight of said successive increments of material positioned on the scale to restore said balance and to measure said deviation, comprising means to detect said unbalance, means for applying force to said double balance system to restore said balance, and means for measuring said force applied to restore said balance.

2. A weighing apparatus for ascertaining in rapid succession deviations in weight of each of a series of increments of materials presented successively to said weighing apparatus with relation to a selected weight according to claim 1 in which the centers of gravity of the masses of said weight and counterweight assemblies substantially coincide for the balance position of said scale both in a vertical plane parallel to the pivot axes of said beams and along a horizontal plane parallel to said axes whereby said masses remain in balance irrespective of translatory and rotational vibratory movements transmitted to said scale.

3 In a weighing apparatus for ascertaining in rapid succession deviations in weight of each of a series of increments of material presented successively to said weighing apparatus with relation to a selected unit weight, the combination of a frame, a mechanically acting balance system including a pair of beam balances mounted with the beams thereof pivotally connected in end-to-end relation on parallel pivots on said frame, an increment support carried by said beams, successively presented increments of material deviating in weight from said selected unit weight, and those portions of said beam balances at the same side of said pivots with said support comprising one of two offsetting masses of said scale, a counterweight of said unit weight carried by said beam, and beams, and those portions of said beam balances at the same side of said pivots with said counterweight comprising the other of two offsetting masses of said scale, one of said support and counterweight being supported from the adjacent ends of the beams of each beam balance for movement in a substantially vertical direction, and the other of said support and counterweight being supported from the opposite ends of the beams of said balances for movement in a substantially vertical direction, each of said support and counterweight being further positioned on said beams with the centers of gravity of said masses lying in the same vertical plane parallel to said pivots and movable vertically in said plane from a balance position in which said centers of gravity approximately coincide horizontally along a line parellel to the pivot axes whereby said masses in said balance position are substantially insensitive to vibratory movements of said scale in any direction, and means sensitive to any unbalance of said scale caused by any deviation from said unit weight by any of said successive increments of material positioned on the scale to restore said balance and to measure said deviation from said unit weight comprising means to detect said unbalance, means for applying force to said beams to restore said balance, and means for measuring said force applied to restore the balance.

4. In a weighing machine for ascertaining in rapid succession deviations in weight of each of a series of increments of material presented successively to said weighing apparatus with relation to a selected unit weight, the combination of a frame, a mechanically acting balance system including a pair of double beam balances mounted with the beams thereof pivotally mounted in end-to-end relation on parallel pivots on said frame, an increment support carried by said beams, successively presented increments of material deviating in weight from said selected unit weight, and those portions of said beam balances at the same side of the pivots with said support, and comprising one of two offsetting masses on said scale, a counterweight of said unit weight carried by said beams, and those portions of said beam balances at the same side of said pivots with said counterweight comprising the other of two offsetting masses on said scale, one of said support and counterweight being supported from the adjacent ends of the beams of each beam balance for movement in a substantially vertical direction, and the other of said support and counterweight being supported from the opposite ends of the beams of said balances for movement in a substantially vertical direction, each of said support and counterweight being further located on said beams with the centers of gravity of said masses lying on the same vertical line and movable away from one another along said line from a balance position in which said masses are substantially insensitive to translatory and rotational vibratory movements of said scale frame, and electrical devices for detecting any relative displacement of said balance position and for restoring said weight and counterweight masses to said balance position.

5. In a weighing apparatus for ascertaining in rapid succession deviations in weight of each of a series of increments of material presented successively to said weighing apparatus with relation to a selected unit weight, the combination of a frame, a mechanically acting balance system including a pair of beam balances mounted with the beams thereof pivotally connected to one another in end-to-end relation on parallel pivots on said frame, an increment support carried by said beams, successively presented increments of material deviating in weight from said selected unit weight, and those portions of said beam balances at the same side of the pivots with said support comprising one of two offsetting masses of said scale, a counterweight for said unit weight carried by said beams, and those portions of said beam balances at the same side of said pivots with said counterweight comprising the other of two offsetting masses of said scale, one of said support and those portions of counterweight being supported from the adjacent ends of the beams of each beam balance for movement in a substantially vertical direction, and the other of said support and counterweight being supported from the opposite ends of the beams of said balances for movement in a substantially vertical direction, each of said support and counterweight being further located on said beams with the centers of gravity of said masses lying on the same vertical line and movable along said line from a balance position in which said centers of gravity approximately coincide also along a line parallel to the pivot axes when the scale is in balance whereby said masses in said balance position are substantially insensitive to both translatory and rotational vibratory movements of said scale, and an electrical device sensitive to any unbalance of said scale for restoring said masses to said balance position and for measuring said unbalance comprising an electrical detector device sensitive to any displacement of the balance system from said balance position, an electrical current carrying circuit acted upon by said detector device, means including a current-to-force transducer for producing a measurable counteracting force to reduce the displacement caused by unbalance to zero, said force being equal to the force exerted by the weight required to effect said balance, and means for measuring the current required to re-establish said balance and thereby the weight deviation from said unit weight.

6. In a weighing apparatus for ascertaining in rapid succession deviations in weight of each of a series of increments of materials presented successively to said weighing apparatus with relation to a selected weight, the combination of a frame, a mechanically acting double balance system including a pair of beam balances having horizontally disposed beams and pivot axes for said beams in parallel relation on said frame, means pivotally connecting a beam end of one beam balance with a beam end of the other beam balance so that said connected beam ends move up and down as a unit, a support assembly having mass which includes a support on which an increment of material is supported for weighing, said increment of material, and those portions of said beam balance system at the same side of said pivot axes with said support, a counterweight assembly having mass which includes said counterweight and those portions of said beam balance system at the same side of said pivot axes with said counterweight, means for supporting one of said support and counterweight from the connected beam ends of said balance system for up and down movement therewith along a substantially vertical path, means for supporting the other of said support and counterweight from an oppositely moving beam portion of said balance system for up and down movements therewith along a substantially vertical path, said support and counterweight assemblies having the centers of gravity of said masses located for movement from a balance position in the same vertical plane parallel to said axes whereby said masses in said balance position are substantially insensitive to both translatory and rotational vibratory movements transmitted through the frame to said scale, and an electrical device sensitive to any unbalance of said scale for restoring said masses to said balance position and for measuring said unbalance comprising a capacitor including a relatively stationary element mounted from said frame and a movable element supported from said balance beams for movement therewith for sensing any unbalancing displacement of the balance system, an electromagnetic device comprising relatively movable coil and magnet elements, one of said coil and magnet elements being mounted from said frame, and the other of said coil and magnet elements being supported from said balance beams for movement therewith, an electrical current carrying circuit including said electromagnetic device, and means for measuring the current required to re-establish said masses in the balance position.

7. In a weighing apparatus for ascertaining in rapid succession deviations in weight of each of a series of increments of material presented successively to said weighing apparatus with relation to a selected unit weight, the combination of a frame, a mechanically acting balance system including a pair of beam balances mounted with the beams thereof in end-to-end relation on parallel pivots on said frame, a support carried by said beam successively presented increments of material deviating in weight from said selected unit weight and those portions of said beam balances at the same side of said pivots with said support, comprising one of two offsetting masses of said scale, a counterweight of said unit weight carried by said beams, and those portions of said beam balances at the same side of said pivots with said counterweight comprising the other of two offsetting masses on said scale, one of said support and counterweight being supported from the adjacent ends of the beams of each beam balance for movement in a substantially vertical direction, and the other of said support and counterweight being supported from the opposite ends of the beams of said balances for movement in a substantially vertical direction, each of said support and counterweight being further located with the centers of gravity of said masses lying on the same vertical line and movable along said line from a balance position in which said centers of gravity approximately coincide also horizontally along a line parallel to the pivot axes when the scale is in balance whereby said masses in said balance position are substantially insensitive to vibratory movements of said scale in any direction.

8. In a scale the combination of a frame, a mechanically acting double balance system including a pair of beam balances, each said beam balance comprising a horizontally mounted beam having a horizontal rocker pivot intermediate its length on said frame, said rocker pivots being in parallel relation and at the same horizontal level with said beams in pivotally connected end-to-end relation, a weight assembly having mass including a support on which an increment of material to be weighed is supported, said increment of material, and those portions of said beam balances at the same side of said rocker pivots on which said support is mounted, a counterweight assembly having mass including said counterweight, and those portions of said beam balance at the same side of said rocker pivots on which said support is mounted, said double balance system including a vertically disposed post pivotally connected with the adjacent ends of said beams on which one of said support and counterweight are mounted for up and down movement with said adjacent beam ends moving as a unit, the said assembly including said post having the center of gravity thereof lying on a vertical line passing through the center of said double balance system, an arm parallel with one of said beams connected between a pivot on the frame vertically in line with the rocker pivot for said last mentioned beam, and a pivot on the post vertically in line with the pivotal connection of said last mentioned beam with the post, a link pivotally connecting the outer ends of said beams on which the other of said support and counterweight is mounted, the same assembly including the outer ends of said beams having the center of gravity thereof located on a line between the link pivots and on said vertical line passing through said post whereby said weight and counterweight assembly masses substantially offset one another during both translatory and rotational movements of the frame, and the scale is rendered insensitive to extraneous vibratory movements transmitted to the scale through said frame.

9. In a scale the combination of a frame, a mechanically acting double balance system including a pair of beam balances having horizontally disposed beams and pivot axes on which said beams are mounted in parallel relation on said frame, means pivotally connecting a beam end of one beam balance with a beam end of the other beam balance so that said connected beam ends move up and down as a unit, a support assembly having means including a support on which an increment of material is supported for weighing, said increment of material, and those portions of said beam balances at the same side of said pivot axes with said support, a counterweight assembly having mass including a counterweight and those portions of said beam balances at the same side of said pivot axes with said counterweight, means for supporting one of said support and counterweight from at least one of said connected beam ends of said balance system for up and down movement therewith in a vertical plane parallel to said pivot axes, means for supporting the other of said support and counterweight from an oppositely moving beam portion of said balance system for up and down movements therewith in a vertical plane parallel to said axes, said support and counterweight having the centers of gravity of the masses of the support and counterweight assemblies disposed for movement away from one another from a balance position along the same substantially vertical path of movement whereby the scale when in said balanced position is rendered insensitive to extraneous vibratory movements transmitted to the scale through said frame.

10. In a scale the combination of a frame, including an upright support post, a mechanically acting double balance system comprising a horizontally disposed beam having a horizontal pivot intermediate its length on said post, a second beam havng a horizontal pivot on said post parallel to in the same vertical plane and at a different vertical level from said first mentioned pivot, a link connecting an end of said latter beam with an end of said first mentioned beam disposed at the opposite side of said post so that said connected beam ends move up and down as a unit, a horizontally disposed arm mounted from the second of said pivots and extending to the opposite side of said post from the connected end of said latter beam, a link pivotally connecting said arm and the free end of the first mentioned beam, an increment support assembly having mass including a support on which an increment of material to be weighed is supported, and said increment of material, a counterweight assembly having mass including a counterweight, means for supporting one of said support and counterweight from one of said links adjacent to said free end of the first mentioned beam, means for supporting the other of said support and counterweight from the second link adjacent to said connected end of said latter beam, each of said support and counterweight being further disposed with the center of gravity of the masses of said support and counterweight assemblies lying along substantially the same vertical plane of movement whereby said support assembly and counterweight assembly masses substantially offset one another during both translatory and rotational movements of the frame, and the scale when in said balance position is rendered insensitive to extraneous vibratory movements transmitted to the scale through said frame.

11. In a weighing apparatus for ascertaining in rapid succession deviations in weight of each of a series of increments of materials presented successively to a weighing apparatus with relation to a selected weight having a double beam balance system including pivotally interconnected beams and parallel pivots for said beams with weight and counterweight assemblies supported by said beams having the centers of gravity thereof located at substantially the same horizontal level and in substantially the same vertical plane parallel to said pivots for a balance position of said scale and movable in said vertical plane in opposite directions from said balance position, and an electrical device sensitive to any unbalance of said scale for restoring said masses to said balance position, which comprises means for loading the scale with an increment of material deviating in weight from the predetermined selected weight of said counterweight, and thereby equalizing the masses of said weight and counterweight assemblies subject only to the unbalance produced by said deviations from the selected weight, and means in said electrical device to apply an electrical force against said interconnected beams of said double beam balance system to restore said weight and counterweight assemblies to said balance position in which said centers of gravity coincide, and thereby to render the scale substantially insensitive to any vibrations transmitted to the scale from its supporting base.

References Cited in the file of this patent

UNITED STATES PATENTS

| | | |
|---|---|---|
| 2,503,697 | Weckerly | Apr. 11, 1950 |
| 2,623,741 | Borekhuysen | Dec. 30, 1952 |
| 2,734,735 | Payne | Feb. 14, 1956 |
| 2,757,924 | Ozai-Durrani | Aug. 7, 1956 |
| 2,793,026 | Giardino | May 21, 1957 |

FOREIGN PATENTS

| | | |
|---|---|---|
| 929,552 | France | Dec. 31, 1947 |
| 777,941 | Great Britain | July 3, 1957 |